US008661129B2

(12) United States Patent
Gnanasambandam et al.

(10) Patent No.: US 8,661,129 B2
(45) Date of Patent: Feb. 25, 2014

(54) SYSTEM AND METHOD FOR DECENTRALIZED JOB SCHEDULING AND DISTRIBUTED EXECUTION IN A NETWORK OF MULTIFUNCTION DEVICES

(75) Inventors: Shanmuga-nathan Gnanasambandam, Webster, NY (US); Robert James St. Jacques, Jr., Fairport, NY (US); Hua Liu, Fairport, NY (US); Bruce Carter Lyon, Victor, NY (US); Michael P. Kehoe, Rochester, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 250 days.

(21) Appl. No.: 12/265,360

(22) Filed: Nov. 5, 2008

(65) Prior Publication Data
US 2010/0115097 A1 May 6, 2010

(51) Int. Cl.
G06F 15/173 (2006.01)

(52) U.S. Cl.
USPC .......................................................... 709/226

(58) Field of Classification Search
USPC .......................................... 709/226; 358/1.15
See application file for complete search history.

(56) References Cited

U.S. PATENT DOCUMENTS

| 6,393,484 | B1 * | 5/2002 | Massarani ..................... 709/227 |
| 6,405,204 | B1 * | 6/2002 | Baker et al. ................. 705/36 R |
| 6,684,241 | B1 * | 1/2004 | Sandick et al. ............... 709/220 |
| 7,233,792 | B2 * | 6/2007 | Chang ........................ 455/422.1 |
| 7,278,142 | B2 * | 10/2007 | Bandhole et al. ............. 718/104 |
| 7,475,128 | B2 * | 1/2009 | Katayama .................... 709/223 |
| 7,475,133 | B2 * | 1/2009 | Nuggehalli ................... 709/224 |
| 7,496,920 | B1 * | 2/2009 | Bandhole et al. ............. 718/104 |
| 7,571,227 | B1 * | 8/2009 | Pabla ........................... 709/224 |
| 7,656,822 | B1 * | 2/2010 | AbdelAziz et al. ........... 370/255 |
| 7,698,389 | B2 * | 4/2010 | Sesek et al. .................. 709/220 |
| 7,730,119 | B2 * | 6/2010 | Bates et al. .................. 709/201 |
| 8,291,015 | B2 * | 10/2012 | Stephens, Jr. ................ 709/204 |
| 2002/0049803 | A1 * | 4/2002 | Bandhole et al. ............. 709/104 |
| 2002/0174209 | A1 * | 11/2002 | Sesek et al. .................. 709/223 |
| 2003/0084102 | A1 * | 5/2003 | Stephens, Jr. ................ 709/204 |
| 2003/0101357 | A1 * | 5/2003 | Ronen et al. ................. 713/201 |
| 2003/0182421 | A1 * | 9/2003 | Faybishenko et al. ........ 709/224 |
| 2003/0217139 | A1 * | 11/2003 | Burbeck et al. .............. 709/224 |
| 2004/0128669 | A1 | 7/2004 | Furst et al. |
| 2004/0199626 | A1 * | 10/2004 | Nuggehalli ................... 709/224 |
| 2005/0004974 | A1 | 1/2005 | Sharma et al. |
| 2005/0216362 | A1 * | 9/2005 | Navar et al. ..................... 705/26 |
| 2006/0072148 | A1 * | 4/2006 | Kovnat et al. ................ 358/1.15 |

(Continued)

OTHER PUBLICATIONS

U.S. Appl. No. 11/824,065, filed Jun. 29, 2007, Venable.

(Continued)

Primary Examiner — Ninos Donabed
(74) Attorney, Agent, or Firm — Fay Sharpe LLP

(57) ABSTRACT

A system and method for scheduling and executing jobs in a decentralized multifunction device (MFD) network is provided. The method includes receiving at an origin node of the network of MFDs a job, where the job includes data and a request to perform an operation on the data. MFDs of the network are selected to execute the requested operation on at least a portion of the job data. Portions of the job data are apportioned to the selected MFDs for processing thereof by executing the requested operation. The selecting and the apportioning are performed using historical information related to previous performance and reliability of the MFDs of the network.

24 Claims, 3 Drawing Sheets

(56) References Cited

U.S. PATENT DOCUMENTS

2007/0146772 A1    6/2007   Castellani
2007/0192702 A1*   8/2007   Takano .................... 715/733
2007/0260716 A1   11/2007   Gnanasambandam et al.
2009/0300176 A1*  12/2009   Shizuno ................... 709/224
2010/0115097 A1*   5/2010   Gnanasambandam
                            et al. ..................... 709/226

OTHER PUBLICATIONS

U.S. Appl. No. 12/129,195, filed May 29, 2008, Gnanasambandam et al.

Quiroz et al., "Clustering Analysis for the Management of Self-monitoring Device Networks", ICAC (2008).

* cited by examiner

SYSTEM AND METHOD FOR DECENTRALIZED JOB SCHEDULING AND DISTRIBUTED EXECUTION IN A NETWORK OF MULTIFUNCTION DEVICES

BACKGROUND

The present disclosure relates generally to job scheduling and distributed execution in a network of multi-functional devices (MFDs). In particular, the present disclosure relates to decentralized job scheduling and distributed execution in a network of MFDs using historical information based on a local view and/or a global view of several device or network related attributes (such as performance of nodes, reliability, configuration, etc.) of the MFD grid.

Some jobs submitted to an MFD, such as large optical character recognition (OCR) jobs, are very resource and time consuming and often take several minutes to complete, particularly for complex documents. The MFD receiving the job may not have the best resources to complete the job relative to other MFDs that it is networked to. In some environments, users initiate large OCR jobs and simply walk away, returning several minutes later to see if the job has been completed. In other more secure environments, users are required to authenticate themselves with the MFD before scanning sensitive documents and must remain at the MFD until the job is finished, causing frustration and potentially wasting valuable time.

SUMMARY

The present disclosure is directed to a grid of multi-function devices (MFDs) having a plurality of nodes, where the plurality of nodes includes a plurality of networked super-peers (SPs) and a plurality of peers. Each SP and peer is an MFD having a processor. The peers are grouped into at least two groups, wherein the peers in a group are in data communication with one another. Each SP of the plurality of SPs is associated with a respective group of the at least two groups for forming a region in which the SP associated with a group of a region is in data communication with each peer in the group.

A peer of the plurality of peers designated as the origin node receives a job which includes data and a request to perform an operation on the data. The origin node initiates advertising of the job for requesting the plurality of peers to participate in executing the requested operation on the data. At least one peer responds that it is available and capable of performing the requested operation. At least one of the responding peers is selected in accordance with at least one of a global ranking and a local ranking associated with the responding peers. The global ranking is based on past performance by the responding peers as viewed by at least two nodes of the MFD grid, and the local ranking is based on past performance by the responding peers as viewed by the origin node. Portions of the job data are apportioned to the selected peers in accordance with at least one of the local ranking and the global ranking of the respective selected peers. The respective portions of the job data are dispatched to the selected peers which they are apportioned to, and the respective selected peers execute the requested operation on the respective portions of job data dispatched to them.

The present disclosure is also directed to a network of MFDs. The network includes a plurality of MFDs. Each MFD is in data communication with at least one other MFD of the network. An MFD designated as an origin node receives a job. The job includes data and a request to perform an operation on the data. At least two MFDs of the network are selected to execute the requested operation on at least a portion of the job data. Portions of the job data are apportioned to the selected MFD's. The portions are dispatched to the MFD to which they are apportioned for execution of the requested operation thereon. Historical information related to at least one of configuration and previous performance of the MFDs of the network is used to perform the selecting and the apportioning.

The present disclosure is further directed to a method for scheduling jobs arriving at an MFD node of a network of MFDs. The method includes receiving at an origin node of the network of MFDs a job, where the job includes data and a request to perform an operation on the data. MFDs of the network are selected to execute the requested operation on at least a portion of the job data. Portions of the job data are apportioned to the selected MFDs for processing thereof by executing the requested operation. The selecting and the apportioning are performed using historical information related to previous performance of the MFDs of the network.

Other features of the presently disclosed system and method for scheduling jobs will become apparent from the following detailed description, taken in conjunction with the accompanying drawings, which illustrate, by way of example, the presently disclosed system and method for scheduling jobs.

BRIEF DESCRIPTION OF THE DRAWINGS

Various embodiments of the present disclosure will be described below with reference to the figures, wherein.

DETAILED DESCRIPTION

Figure 1:
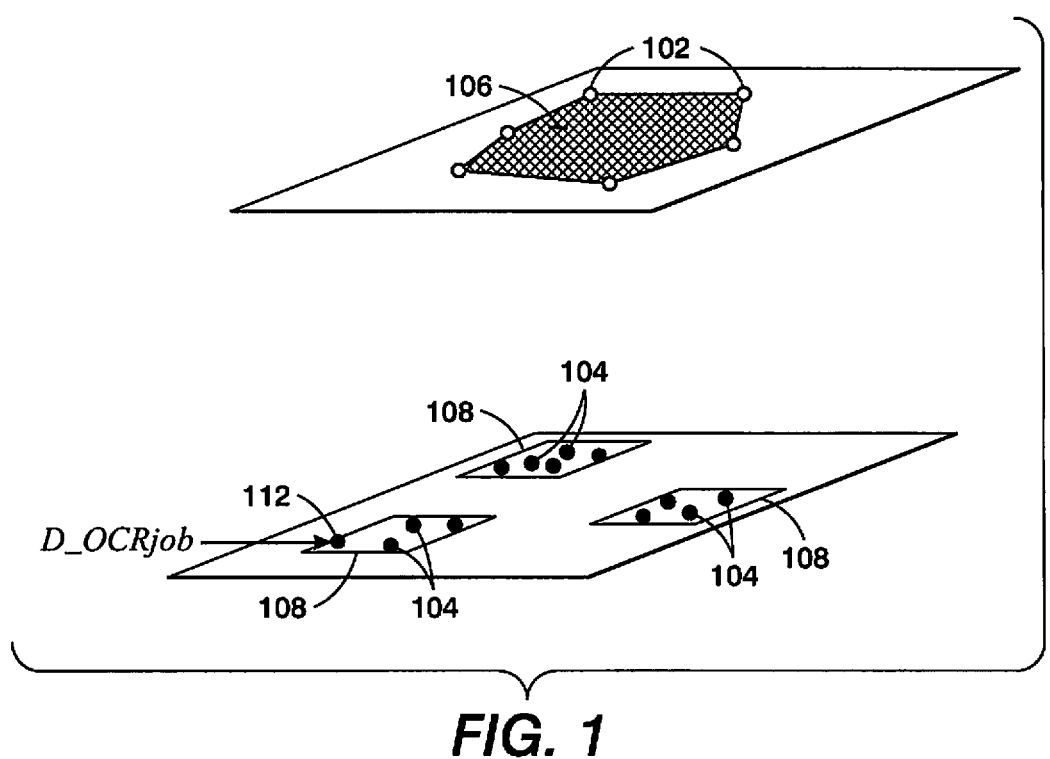
FIG. 1 is a block diagram of an exemplary multifunction device grid in accordance with the present disclosure.

The present disclosure is directed to the scheduling and distributed execution of jobs submitted to a multifunction device (MFD) that is included in a network of MFDs. The job is divided into portions that may be executed in parallel by more than one MFD of the network. The scheduling of the job includes selecting MFDs from the network of MFDs to execute portions of the job and apportioning the portions of the job to the selected MFDs. The selecting and apportioning is based on historical data maintained about the MFDs of the network. The historical data used may include historical data maintained locally by the MFD that originally received the job (the origin node) based on the performance of the other MFDs in the past from the perspective of the origin node (local rankings), or historical data based on performance of the MFDs and/or design specifications of the MFDs of the network from the a global view of the network (global rankings).

The network of MFDs is a decentralized network. Jobs may be submitted to any MFD of the network, and that MFD becomes the origin node. The origin node is not a centralized server. The origin node splits the job into portions and the job is scheduled for execution by other nodes of the network. The scheduling does not include consulting a centralized database for accessing historical data about other nodes of the network for making scheduling decisions. Rather, historical information is used that is maintained and stored locally by the origin node (local rankings) or maintained and stored in a distributed fashion by MFDs of the network (global rankings). In the decentralized network there is not a central server (i.e., it is serverless) for the purpose of orchestrating the scheduling and dispatch of jobs. The various nodes of the network can act as servers by handling job requests, splitting the job, and apportioning the job to selected other nodes of the network. A node may act as a server by distributing a first job among other nodes of the network. The same node may act as a client at one time by scheduling a first job, and as a server at a different time by executing a portion of a second job which was assigned to it by another node. Thus, the nodes switch roles of being a server or a client.

The selecting of the MFDs and apportioning of the job to the selected MFDs may be performed by MFDs playing different roles in the network. The apportioning herein refers to assigning a portion of data associated with the job to respective selected MFDs. The apportioning does not include dispatching the data or pointers to the data that is to be processed, as this is performed in a next step by the origin node.

In the exemplary system described below, the network is an MFD grid, however the disclosure is not limited thereto, and other networks may be used in which many nodes in the network can act as non-servers and schedule a received job by splitting the job into portions and apportioning the job portions to selected nodes for execution thereof. Furthermore, in the example provided below, the job may require that optical character recognition (OCR) is performed on a data file. However, the job is not limited to jobs that require OCR, but may be any job that requires an operation in which the job can be split up into portions that can be executed in parallel by different nodes of the network, such as Raster Image Processing (RIPping), text indexing, image manipulation, text searching, etc.

Referring now to the drawing figures, in which like references numerals identify identical or corresponding elements, the decentralized MFD grid and method for decentralized job scheduling and distributed execution in accordance with the present disclosure will now be described in detail. With initial reference to FIG. 1, an exemplary decentralized MFD grid in accordance with the present disclosure is illustrated and is designated generally as decentralized MFD grid 100. The MFD grid 100 provides for peer-to-peer job scheduling in which MFDs of the MFD grid 100 are selected to execute the job, where selecting and apportioning of the job includes heeding local rankings and/or global rankings of the MFDs.

The MFD grid 100 splits jobs into portions made of work chunks for parallel execution of the portions by the selected resources without human intervention. The administrative task of splitting the job and selecting the resources may be performed in parallel by more than one node of the MFD grid 100. The MFD grid 100 is decentralized, where the task of administrating job scheduling is distributed among the nodes of the MFD grid 100 and is not performed by a central server. Nodes of the MFD grid 100 may play the role of a server which administrates a job or a portion thereof, or a client that executes a job or a portion thereof.

Figure 2:
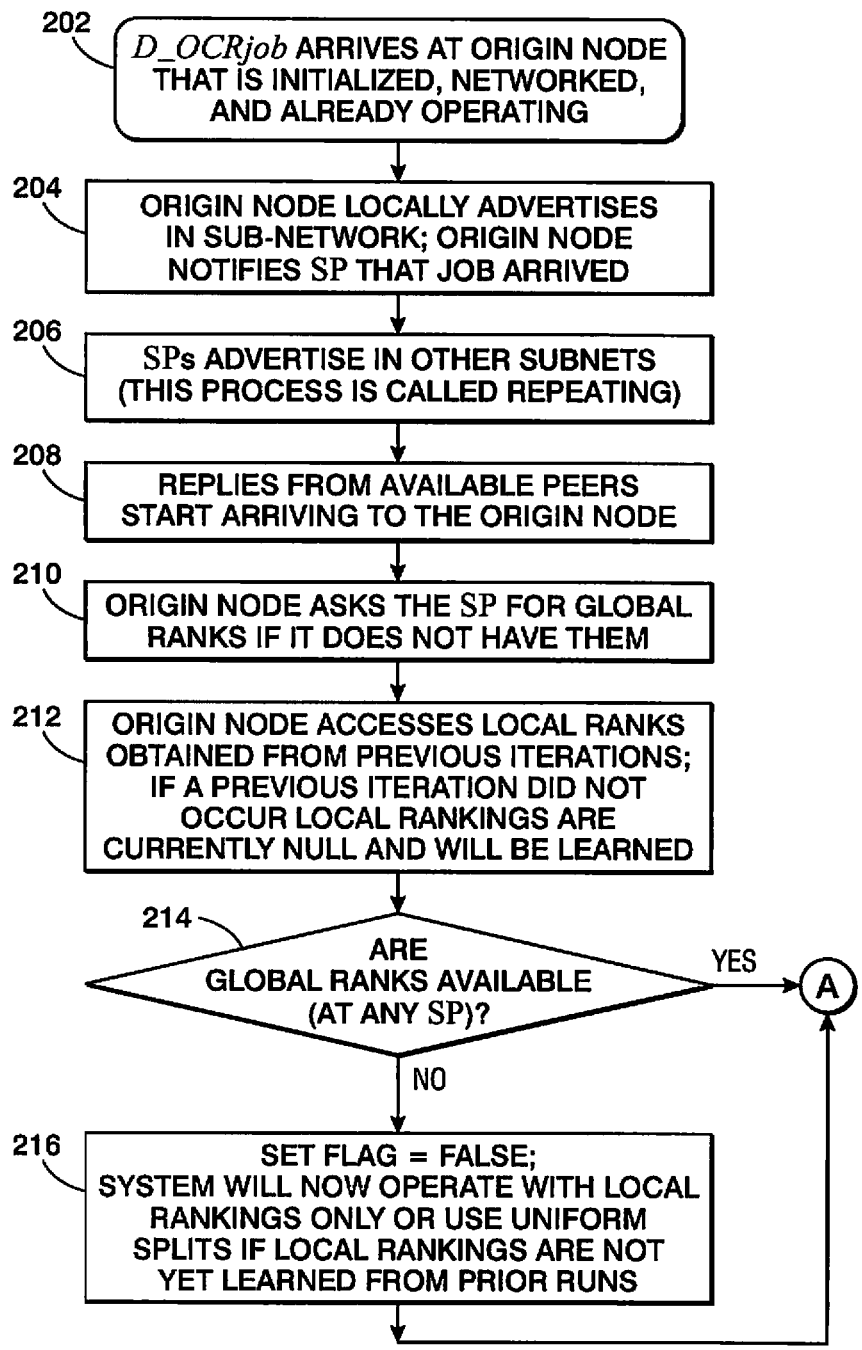
FIG. 2 is a flowchart diagram of a method of scheduling a job received in a network of MFDs.

MFD grid 100 includes a plurality of nodes, including a first type of node, SPs 102, and second type of node, peers 104. The SPs 102 and peers 104 are any computing devices that have processing capabilities, execute grid software, and have data communication possibilities for communicating with at least one other peer 104 and SP 102 in the MFD grid 100. The peers 104 and SPs 102 of the MFD grid 100 may be computing devices that are not MFDs but have data communication and processing capabilities, such as personal computers, mobile devices (e.g., PDAs, cellular phones), laptops, servers, etc. However, in the current example, all of the nodes involved in performing the method shown and described with respect to FIG. 2 are MFDs (with or without bridge boxes, described further below) to illustrate that each of the SPs 104 and peers 104 can be MFDs. An MFD or other device that is a node of the MFD grid 100 may be designated to be a peer 104 or an SP 102 by election, by an administrator, randomly, by a policy, etc. SPs 102 are more likely to be occupied by administrative tasks, and peers 104 are more likely to be occupied by user requested operations, such as optical character recognition (OCR). The designation for a node of peer 104 or SP 102 may be based on a specific attribute, such as location or resource availability.

An SP 102 or peer 104 may also be a device, such an MFD or other computing device, which is paired with a bridge box. The bridge box is a low cost computer which is in data communication with the MFD grid 100 and the device that it is paired with and functions within the MFD grid 100 on behalf of the device. The bridge box participates in the MFD grid 100 on behalf of the MFD, acting as proxy for the MFD. When a peer 104 having a bridge box paired with an MFD is requested to execute an operation, the requested operation may be executed on the bridge box, utilizing the bridge box's resources, or may be executed on the MFD. For example, a bridge box may perform OCR on a scanned image and then redirect the image or OCR output to the MFD to produce a hard copy. A bridge box may be paired with an MFD that does not conform to the requirements of the MFD grid 100 so that the MFD can be included in the MFD grid as an SP 102 or a peer 104. The bridge box may be configured to discover and proxy for one or more devices which are either incapable of or disallowed from joining the MFD grid 100 as SPs 102 or peers 104.

Each SP 102 and peer 104 must execute grid software in order to participate in the MFD grid 100. Where the SP 102 or peer 104 is an MFD, the grid software may be installed directly on the MFD or may be installed on a bridge box paired with MFD. Since many MFDs are idle a majority of the time, the grid software may run as a low priority process and still function adequately during MFD idle times. If a higher priority process is requested (such as a request for local printing or scanning at the MFD) which requires system resources, the grid software should provide those resources at its own expense (e.g. by dropping out from the role of a remote service provider).

In the present example the MFD grid 100 is a trusted network of cooperating devices. In the exemplary MFD grid 100 shown, the SPs 102 are included in an overlay network 106. The peers 104 are grouped in regions 108 or sub-networks, with each SP 102 associated with a region 108. The SPs 102 and peers 104 may be MFDs, with the SPs having sufficient processing power to perform the administrative tasks assigned to it. U.S. patent application Ser. No. 11/382,107, which is herein incorporated by reference in its entirety, discloses one exemplary way in which nodes are automatically elected to be SPs 102 (where SPs are referred to as clusterheads).

The term "MFD" as used herein throughout the disclosure encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. Additionally, the MFDs are provided with a storage device, such as a hard drive, for storing data such as meta-data and caches and software modules. The MFD may further have capabilities, such as scanning, faxing and emailing.

The establishment, configuration and operation of the MFD grid 100 as a serverless network is now described, and is further described in U.S. patent application Ser. No. 12/129,195, which is herein incorporated by reference in its entirety. Each SP 102 is in communication with at least one other SP 102 via the overlay network 106, and is further in communication with at least one peer 104 of the region 108 it is associated with. Each peer 104 is in communication with at least one other peer in its region 108 and the SP 102 associated with its region 108. Communication between the SPs 102 and the peers 104 may be wired or wireless, with the SP's 102 and the peers 104 together forming a network, and the peers 104 of a region 108 together with the SP 102 associated with the region 108 forming a sub-network.

The peers 102 in a region 108 may communicate with one another via a unicast or a multicast, where a unicast is sent by one peer 104 to one other peer 104 in the region 108 (e.g., point to point). A multicast may be transmitted from a peer 104 to all other peers 104 in its region 108. It is possible that communication amongst peers 104 be limited to unicast. The SP 102 associated with a region 108 may communicate with all peers 104 in the region 108 via multicast, or may communicate with a particular peer 104 via unicast. The origin node 112 communicates with its region's 108 SP 102 through unicast. SPs 102 communicate with other SPs 102 through unicast. An SP 102 repeats a message (such as a job advertisement) received from another SP 102 by multicasting the message in its region 108 so that a wider audience of peers 104 hears the origin node's 112 advertisement. The peers 104 in other regions 108 reply to the advertisement by unicast back to the origin node 112. The SPs 102 communicate with each other through a ring-like network structure. Each SP 102 and peer 104 is provided with the necessary communication interface for supporting communication with the other nodes, such as via unicast, multicast and/or broadcast.

The overlay network 106 establishes a mapping between the SPs 102 and their associated regions 108. Furthermore, the overlay network 106 may provide a safety net, such as in the event that one SP 102 fails, by providing for another SP 102 to take up the failed SP 102's role. The SPs 102 may be in constant communication with one another via the overlay network 106. An SP 102 in a first region 108 may gather information about peers 104 in a second region 108 via the SP 102 associated with the second region 108.

MFD peers 104 may operate symbiotically by accepting and/or offering resources from and to MFD and non-MFD peers 104, such as desktop personal computers (PCs), laptops, servers and mobile devices, subject to availability. In order to formally join the grid, a peer 104 must discover at least one other peer 104 already in the MFD grid 100. Such discovery may be achieved, for example, by issuing a multicast request on the local subnet of a region 108 or by pre-configuration. Peers 104 maintain their membership in the MFD grid 100 through responding to periodic messages (known as heartbeat messages), wherein upon failing to respond they are removed from the MFD grid 100.

The MFDs at the various nodes of the MFD grid 100 may have different capabilities. For example, some of the MFDs may have lower processing and storage resources than other MFDs; some MFDs may have features that other MFDs do not have. For example, some MFDs may have software capabilities, such as the capability of performing optical character recognition (OCR) that other MFDs do not have. One reason for this is that MFD grid operators can reduce costs by taking out software licenses, such as for software that performs OCR on only selected MFDs.

FIG. 1 shows a job arriving at an origin node 112 which is a peer 104 in the current example. In a different example, the origin node 112 may be an SP 102. However, depending on the nature of the job and the capabilities of the origin node 112, it may not be the best node of the MFD grid 100 to handle the job. For example, the origin node 112 may not have the capability of performing the job or may be currently disabled. In addition, it may be more efficient for another node of the MFD grid 100 to execute the job instead of the origin node 112, or to break up the job into work chunks and have more than one peer 104 (which may or may not include the origin node 112) execute the work chunks in parallel.

For example, a large OCR job, especially where the job entails performing OCR on a complex document, may be performed more efficiently when broken into work chunks executed in parallel by at least two peers 104. When such a job is executed by the origin node 112 only, a user may either physically have to wait for the job to complete, or to walk away from the MFD and return several minutes later to see if the job has been completed. What is more, a user may desire to submit an OCR job to a nearby MFD node, but the MFD node may not have OCR capability, forcing the user to go to a different MFD node that may be located in a less convenient location.

Accordingly, a job received by a node in the MFD grid 100 is divided into portions formed of work chunks. Scheduling of the job includes selecting one or more nodes of the MFD grid 100 to execute the job, and apportioning the job portions to the selected nodes, where the apportioned amounts are determined in terms of predetermined work chunks. As stated above, the apportioning herein refers to the computation associated with assigning a portion of the data of the job request to respective selected MFDs. The apportioning does not include dispatching the data or pointers to the data that is to be processed, as this is performed in a next step by the origin node 112.

In the current example, the size of a work chunk is defined in terms of number of pages (e.g., a work chunk can be one page or five pages), however other units could be used to determine work chunk size, such as number of characters. The work chunk size is customized and may be optimized for the operation to be performed. In the present example, the operation is OCR, and the work chunk size is optimized for OCR accuracy and for the OCR engine used by the nodes of the MFD grid 100. The selection of the nodes and apportioning to selected nodes is based on local rankings and/or on global or pseudo-global rankings of the nodes. Local rankings of nodes of the MFD grid 100 are based on statistics collected and maintained locally on the origin node 112, where the statistics are associated with performance of the ranked nodes receiving, executing or replying to the jobs dispatched by the origin node 112 to the ranked nodes. Global or pseudo-global rankings of nodes of the MFD grid 100 are based on information about configuration of the ranked nodes and/or statistics collected iteratively over time and maintained by the SPs 102, where the statistics may be associated with performance of the ranked nodes based on local rankings from multiple nodes of the MFD grid 100. Determination of the local rankings and (pseudo-)global rankings is described in greater detail below.

Local rankings are dynamic rankings determined locally by each peer 104. SPs 102 may also determine local rankings. The local rankings generated by each node (peers 104 or SPs 102) are rankings by a particular node of other nodes based on statistics associated with that particular node's experience with the other nodes. The origin node 112 can only have a local ranking for another node with which it has had a previous interaction, otherwise the origin node 112's local ranking for the other node is null or an appropriate default value suitable to the MFD grid 100.

Each node keeps statistics based on its interactions with other nodes in the MFD grid 100. Any node may receive a job and thus become an origin node 112. Thus, when a node is an origin node 112 and dispatches a job or a portion of the job to another node (e.g., an ith node of the MFD grid (where 1<=i<=n, for n nodes)) it maintains statistics on the ith node's performance. The statistics include, for example, data indicating the ith node's success in completing an assigned operation (such as OCR); the time taken by the ith node to complete the requested operation (e.g., OCR) on a standard amount of data, such as a work chunk; the time taken for the work chunk to reach the ith node; the time taken by the ith node to return output data for the job; a trust level based on the ith node's configuration and capabilities; and/or the preference shown by humans towards the ith node for performing various services, such as OCR. The statistic may be adjusted to account for the complexity of the data upon which the operation was performed.

The next time that the origin node 112 receives a job (thus once again becoming an origin node) it uses these statistics to rank nodes which it is considering dispatching a job or a portion thereof to. The rankings are used for selecting which nodes to dispatch a job or a portion thereof to, and for apportioning the amount of the job that will go to each selected node. The local statistics and rankings generated by nodes of the MFD grid 100 about a particular peer 104 may differ from node to node, such as based on the relative physical positions within the MFD grid 100, physical and computational capabilities and resources, and popularity and reliability amongst users between the ranking and the ranked nodes Global rankings are dynamic rankings based on a combination of information generated by the various nodes of the MFD grid 100 based on experience of the various nodes sharing loads and resources with one another. The global rankings for a node may also be just based on information available about the capabilities of the node (e.g., as scored based on a scale ranging from very powerful to not so powerful). Global rankings may also be computed based on a collection of local rankings obtained from individual SPs 102 or peers 104. The SPs 102 may collect data from the peers 104 in their region 108, and the SPs 104 may share information with one another to generate the global rankings. The global rankings are generated in a distributed manner by different nodes of the MFD grid 100 and shared amongst them without the use of a central server, as there is no central server in the MFD grid 100. The global rankings are not stored in a centralized database, but rather are stored locally at the nodes of the MFD grid 100 and shared as needed. A peer 104 may generally obtain global rankings for a particular node, when available, from the SP 102 associated with its region 108.

The global rankings serve as a recommendation that the peers 104 may heed, such as with probability $p_h$. The global rankings for a node may indicate capabilities of the node (e.g., speed, storage, operations that it is capable of executing (e.g., OCR capable or not). In the current example, the global rankings may indicate the amount of time that the node has spent in the past in performing OCR on a standard amount of data. The rankings may be adjusted for complexity of the data. Alternatively, the global rankings may be static rankings assigned by an administrator based on knowledge, such as manufacture provided specifications, about the node being ranked.

In the present example, the local rankings and global rankings for a peer 104 are expressed as normalized numbers generated based on statistics related to past performance of that peer. Other ways of expressing the local and global rankings are within the scope of the disclosure.

Either the origin node 112 or its associated SP 102 may apply an algorithm that uses local and/or global rankings to select nodes to execute a job or a portion thereof, and to apportion the job amongst the selected nodes. Two exemplary algorithms are described further below. If either of the local or global rankings are not available, the other may be used. If neither are available, the job may be apportioned evenly amongst all node candidates. The respective nodes will report statistics on their performance executing the apportionment assigned to them back to the origin node 112. These statistics are then used for generating local rankings.

With reference to FIGS. 1 and 2, at step 202, a job, D_OCR arrives at the origin node 112, which in this example is a peer 104. The job includes a request to perform an operation and data (also referred to as job data), upon which the operation is to be performed. In the present example, the operation requested to be performed is OCR, however the processing of the job described below is applicable to requests for other types of operations as well. The data may include one or more files including, for example, a document having alphanumeric data and/or an image having image data. The job may originate from a user request, e.g., submitted at the origin node 112 or at a workstation in data communication with the origin node 112. The job may also originate from a processor generated request. If the request includes an instruction for the origin node 112 to execute the entire job (e.g., for security purposes), the instruction will be followed. Otherwise, at steps 204 and 206 the origin node 112 sends out job advertisements to peers 104 in its region and to its associated SP 102.

At this point, the origin node 112 breaks the job data of the job into work chunks. A work chunk size is usually pre-established based on prior testing during the development of a particular OCR engine. In some cases, it is necessary to set the work chunk size to a few pages where the number of pages is optimized so that look-up tables (LUTs) that are 'learned' from the document are most effective. In some OCR engines, care must be taken to purge these LUTs to prevent the risk of software instabilities, since a very large LUT creates delays for the OCR engine in look-up and maintenance. Accordingly, when the data associated with the job includes a document having n pages, the document is divided into ntotal work chunks of size c (ntotal=n div c work units (where div is the integer divide operator)). The last work unit may be less than c pages.

The job advertisements describe the operation that needs to be performed on the smallest unit of job data available, which in the current example is "OCR for at least one work chunk whose maximum size is n div c." The job advertisements are requests for other peers 104 to respond if they are available or capable of executing the requested operation on the described portion of job data. In the present example, the advertisement is sent from the origin node 112 via multicast to all peers 104 in the origin node's 112 region 108, via unicast from the origin node 112 to its region's 108 SP 102; via unicast from the SP 102 to one or more other SPs 102; via multicast from each of the other SPs 102 to peers 104 in its respective region 108.

In the present example, the advertisement is sent from the origin node's 112 SP 102 to a second SP 102 via unicast, which in turn sends a unicast to a third SP 102, and so on, until all SPs 102 have received the advertisement or some other condition has been satisfied. There is a greater time delay for some SPs 102 to receive the advertisement than others, which is acceptable, as explained further below.

At step 208, the origin node 112 receives replies to the advertisement from peers 104. The origin node 112 may wait a predetermined time interval before processing the replies and making decisions based on the received replies. Any replies received after the predetermined time interval may be ignored. The predetermined time interval may be adjustable or selectable by the origin node 112, such as based on the size of the job submitted and any time constraints or lack thereof submitted by the user with the job. Replies from peers 104 that are in different regions 108 may take longer to arrive than from peers 104 in the origin nodes 112 region 108. This delay may increase as the physical distance between the SP 102 associated with the origin node's region 108 and the SP 102 associated with the region 108 of the responding peers 104 increases. Accordingly, by selecting the predetermined time interval, the origin node 112 (or administrator thereof) may determine whether or not to allow peers 104 of regions 108 that are physically distant from the origin node 112 to execute an operation associated with the job.

Only peers 104 which are available and capable at the present time reply to the job advertisement. Peers 104 which are not capable, such as do not have the necessary resources, or are not available, e.g., do not have a consumable, such as paper or toner, or are occupied with another job, do not reply to the job advertisement. Peers 104 which do not reply will not be considered as candidates from which to select peers 104 to execute a portion of the job. It is also possible that an SP 102 will reply to the advertisement as an available node to execute the requested operation. Nodes which respond to the advertisement are referred to as respondents. The origin node 112 may respond to the advertisement. Alternatively, the origin node 112 may consider itself as a respondent even if it did not technically respond to the advertisement. In another scenario, the origin node 112 may be dedicated to scheduling the job and be considered as not available to execute the job. If there are no respondents the origin node 112 will execute the job itself. If there is only one respondent, the origin node 112 will schedule that respondent to execute the job.

The replies to the advertisement may include the global rankings of the responding peer 104. Typically, the peers 104 store their own global rankings and may report them when responding to job advertisements. The replies may be delivered, for example, by unicast. Some peers 104 may not store their own global rankings, such as due to storage constraints. In that situation, at step 210, the global rankings may be obtained from the SP 102 of the origin node's 112 region 108, which either stores all global rankings or can obtain them from the SP 102 associated with the peer 104 for which a global ranking is desired. The SP 102 of the origin node's 112 region 108 may be responsible for assuring that all global rankings are provided to the origin node 112, or the origin node 112 may have to request its SP 102 (i.e., the SP 102 of the origin node's 112 region 108) to supply information that it needs.

At step 212, the origin node 112 accesses stored local rankings if they are available. At step 214, a determination is made if the global rankings are available, e.g., via any SP 102. If so, execution passes to step 300 of FIG. 3. If not, at step 216 a flag is set to false to indicate that the global rankings are not available and that only local rankings should be used, after which execution passes to step 300 of FIG. 3. If local rankings have not yet been generated, then the job will be apportioned to all responding peers 104 in uniform amounts. The responding peers 104 will report statistics to the origin node 112 about their performance in executing the job, and the origin node 112 will then use those statistics to generate local rankings for all of the responding peers 104.

Since the MFD grid 100 is a trusted network of cooperating devices, information that is reported from one node of the MFD grid 100 to another node is considered to be reliable. Such information may include, for example, global or local rankings or statistics.

At step 300, a determination is made about whether scheduling of the job will be performed by the SPs 102 or by the origin node 112. The decision may be made by the SPs 102 or the origin node 112. It may be made according to a default decision programmed by an administrator, or it may depend on a condition, such as whether the SPs 102 or origin node 112 are available or capable of performing the scheduling process.

If the determination from step 300 is that the SPs 102 will perform the scheduling, then step 302 is executed next and steps 312, 314, 316 and 318 are performed by the SPs 102. Otherwise, step 310 is performed next, and steps 310, 312, 314 and 316 are performed by the origin node 112.

When the SPs 102 perform the job scheduling, at step 302, the job is divided into portions so that each SP 102 that is going to work on the scheduling problem is assigned a portion. The SPs 102 that are going to work on the job may be limited to SPs 102 associated with regions 108 that include a peer 104 which replied to the job advertisement. If only one SP 102, such as the SP 102 associated with the origin node's 112 region 108, is going to work on the scheduling problem, step 302 may be skipped. When a job is divided into portions it is divided by work chunks such that each portion will have a certain number of work chunks. Each portion corresponds to a range of pages of the data file associated with the job. It is possible that all of the SPs 102 that are going to work on the scheduling problem will receive a substantially equal portion, i.e., their portion will cover a substantially equal number of pages. For example, if m SPs 102 are going to work on the scheduling problem, then the job is divided into m equal portions. If the data file provided with the job has $n_{total}$ work chunks, then each portion has $n_{total}$ div m work chunks. It is possible that the portions may not be equal, such as based on the capability or availability of the SP 102 that the portion is going to be assigned to or the number of peers 104 in the SPs 102 region that replied to the job advertisement.

At step 304, each of the page ranges corresponding to a portion is dispatched to a respective SP 102. The job data itself is not dispatched, but information indicating the page range is dispatched. The page range information is also referred to as a portion assignment. At step 306, the SPs 102 to which a portion assignment was dispatched get the local rankings maintained by the origin node 112 and prepare to perform the scheduling problem by scheduling its portion assignment in a distributed fashion for execution by one or more peers 104. The local rankings provided may be limited to only the local rankings that the particular SP 102 will need, e.g., for the pool of peers 104 that the particular SP 102 will schedule to execute a distributed segment of the portion, which may be (but is not limited to) the peers 104 in the particular SP's 102 region 108. The SPs 102 to which a portion assignment was dispatched further initialize themselves to prepare for scheduling their respective portion assignments in order to be ready to schedule in a distributed fashion.

The local rankings obtained in step 306 may be provided to the SPs 102 at the same time that the portion assignments are dispatched, or the SPs 102 may have to request them from the origin node 112. Each SP 102 may communicate with the origin node 112 using the overlay network 106 to communicate with the SP 102 associated with the origin node's 112 region 108, which in turn communicates directly with the origin node 112.

It is envisioned that steps 302, 304 and/or 306 may be performed by the origin node 112 even if at step 300 it was decided that the SPs 102 would perform the scheduling. In this case, the origin node 112 dispatches the job portion assignments and/or local rankings to the SPs 102 via the SP 102 associated with its region 108, and may further communicate the results of step 302 to the SP 102 associated with its region 108. In the present example, however, the SP 102 associated with the origin node's 112 region 108 performs steps 302 and 304. At step 306, each SP 102 that receives a job portion assignment requests local rankings for peers 104 in its region 108 if they were not provided with the job portion. The request for local rankings may be made to the SP 102 associated with the origin node's 112 region 108 which can obtain the local rankings from the origin node 112. Execution continues at step 312.

At step 308, the SPs 102 that received portion assignments for the job access the global rankings that they need, e.g., global rankings for the pool of peers 104 that the particular SP 102 will schedule to execute a distributed segment of the portion assignment, which may be (but is not limited to) the particular SP's 102 region 108.

When the origin node 112 performs the job scheduling, at step 310, if the flag was not set to false in step 216, the origin node 112 collects global ranks for the peers 104 that replied to the job advertisement, unless it already has them. The origin node 112 may query the SP 102 associated with its region 108 to obtain the global ranks that it needs.

At step 312, a selection is made whether to use a heuristic algorithm (Algorithm 1) or an optimization algorithm (Algorithm 2). The selection may be decided by default assigned by an administrator or may depend upon satisfaction of a particular condition, such as a time constraint or whether or not there is a need for optimization. If Algorithm 1 is to be used, step 314 is performed. If Algorithm 2 is to be used, step 316 is performed. The algorithms are described further below. Where the SPs 102 are performing the selected algorithm, each SP 102 performs the algorithm for its portion assignment, and works with the respondent peers 104 in its own region 108 by distributing its portion assignment to those respondent peers 104. The output of the algorithms indicates the portion of the job (also referred to as a portion assignment) that is to be provided to the respective peers 104 for execution. This indicates how the job is split up and which proportion of the job each peer 104 is assigned to perform. When the algorithm is performed by the SPs 102, the results are provided at step 318 to the origin node 112. This step can be omitted if the origin node 112 executed the selected algorithm.

When more than one SP 102 is solving the scheduling problem, the SPs 102 may perform steps 306, 308, 312, 314, 316 and 318 in parallel. This may be referred to as scheduling in parallel, in which each of the SPs 102 may perform any of the aforementioned steps at substantially the same time that any of the other SPs 102 are performing any of the aforementioned steps.

When the SPs or the origin node 112 are solving one scheduling problem relating to a first D_OCR job, a second job may arrive. In this case, the second job waits in a queue until the first job has completed its scheduling and is ready for execution. The second D_OCR job may start its scheduling phase when the first D_OCR job's portion assignments are being dispatched and/or executed.

At steps 320, 322 and 324, the job is executed in a distributed fashion, referred to as distributed execution, in which the portion assignments are dispatched to and executed independently by the selected respondent peers 104, after which the output generated by the selected respondent peers is assembled by the origin node 112. At step 320, the origin node 112 dispatches to each respondent peer 104 which was selected by an SP 102 and apportioned a portion assignment its respective portion assignment by transmitting to the peer 104 a portion of the job data that corresponds to its portion assignment. The job data may have already been stored in a common storage area on the network accessible by the peers 104 to which portion assignments are dispatched. In this case, at step 320 the origin node 112 dispatches to the peer 104 a pointer to the portion of the job data in the common storage area that corresponds to the peer's 104 portion assignment. The dispatched data or pointer includes a request or an identifier of the job advertisement that was previously sent for the job, which indicates to the peer 104 the operation that needs to be performed on the job data.

At step 322, each of the respondent peers 104 that was selected to execute a portion assignment executes the operation on the job data that corresponds to its respective portion assignment and returns the corresponding output data (i.e., output from execution of the operation on the data corresponding to the portion assignment) to the origin node 112. The output data in this example is alphanumeric data generated from performing OCR on the job data that corresponds to the portion assignment. The output data may be returned to the origin node 112 by transmitting the output data to the origin node 112 or by storing the output data in a common storage area accessible by to the origin node 112 and transmitting to the origin node 112 a pointer to the output data. The peers 104 also report statistics to the origin node 112 that reflect their performance in executing the portion assignment, e.g., the time spent and the quantity of data. Complexity of the data may also be indicated.

At step 324, the origin node 112 reassembles the output data from all of the peers 104 that executed portion assignments into a cohesive output, such as an output file, and completes the job. Furthermore, the origin node 112 updates local rankings for each of the peers 104 that reported statistics.

In addition to scheduling a single received job, such as D_OCR, when more than one job is received at a time by the MFD grid 100 resources are allocated to each of the jobs in accordance with a degree of urgency associated with the job.

Some redundancy may be built into the scheduling of the job, D_OCR by the SPs 102. For example, at step 304, a single portion assignment may be dispatched to more than one SP 102 for the scheduling thereof. Accordingly, several SPs 102 may race to schedule the same portion assignment. At step 320, the origin node 112 dispatches the portion assignment according to the schedule generated by the first SP 102 to finish scheduling the portion assignment and provide the results to the origin node 112 at step 318.

Redundancy may also be built into the dispatching of the portion assignments to the peers 104 for execution thereof. For example, at step 320, the origin node 112 may dispatch job data for the same portion assignment to more than one peer 104. Accordingly, several peers 104 may race to execute the same portion assignment. At step 322, the origin node 112 receives the output data corresponding to execution of the portion assignment from the first peer 104 to complete execution, and uses this output data for reassembling at step 324.

The scheduling redundancy and the dispatching redundancy may increase resource consumption, but this may be considered inconsequential when there is a large amount of idle resource capacity. The advantage is that reliability and robustness to intermittent failures is increased.

Two exemplary scheduling algorithms are now provided which may be used by the origin node 112 or its SP 102 for selecting nodes to dispatch a job or portions thereof to and for apportioning the job amongst the selected nodes. The peers 104 that replied to the job advertisement are also referred to as respondents or servers.

In Algorithm 1 is as follows:

---
Algorithm 1 Scheduling Heuristic
---
Input: R : set of servers that responded (1 X N), Q: QoS history matrix (N X |S|) for time period T
w: weights matrix (1 X |S|) i.e. $w_e \forall_s \in S$, heed probability $p_h$
Output: $(n_1 : n_2 : n_3 : ... : n_N)$
1. Collect global rankings G i.e. the scalar rank $g_i$ for each $i \in R$ from SP or respondent
2. Normalize the Q matrix by dividing each column j by $\Sigma_k qk_j$ where k is the row index
3. Perform local rankings $L = Qw^T$
4. Determine the net ranking as $\psi = p_h G + (1 - p_h)L$
5. Branch the work units in the ratio floor($n_{total}\psi^T$)
(note: server with highest rank may be sent one extra work unit to count the unaccounted fractions)

---

Algorithm 1 employs global and local rankings, either which of could be set to the value 0 if no rankings are available or to a value per an administrator's choice. Algorithm 1 uses a heuristic approach. The servers are the peers 104 that replied to the job advertisement. The inputs include R, Q and w. R is a 1×N matrix of IDs identifying the N respective peers 104 that replied. Q is an N×|S| matrix of historical quality of service (QoS) values for each stage of the job portion performed by each server (where S is the set of stages and |S| denotes the set cardinality operation). The historical QoS values are obtained from the local rankings stored by the origin node 112 on each of the servers. If local rankings are not available for a server, the QoS values for the server will be null value or a default value set by the administrator.

The job portion assignments executed by the respective servers are executed in parallel. Execution of each job portion assignment includes a number of stages, which in the current example includes get_data, ocr and send_result, where get_data refers to getting the data to be operated on by the server, ocr refers to performing the OCR operation, and send_result refers to sending the data output from the ocr stage from the server to the origin node 112. The QoS value for each of the stages may be expressed, for example, in terms of the amount of data that is processed at that stage within a given time period T, or in terms of the amount of time that it takes to process a given amount of data.

w is a 1×|S| matrix which expresses the importance given to each stage by the administrator that influences how much data is included in the job portion apportioned to each server. For example, if the stages that relate to network transmission time are assigned lower weight, then the scheduling algorithm will presume that it is immaterial whether the job portion assignments are assigned to respondent peers 104 which are physically located closer to the origin node 112 or much farther apart. However, if it is desired that the job portion assignments be assigned to respondent peers 104 which are physically closer to the origin node 112, then the aforementioned weights relating to network transmission are set at higher values. The output is a (1×N) matrix that indicates the number of work chunks that are to be dispatched to each of the servers or the proportion of the job to be dispatched to each so the servers in terms of work chunks.

Figure 3:
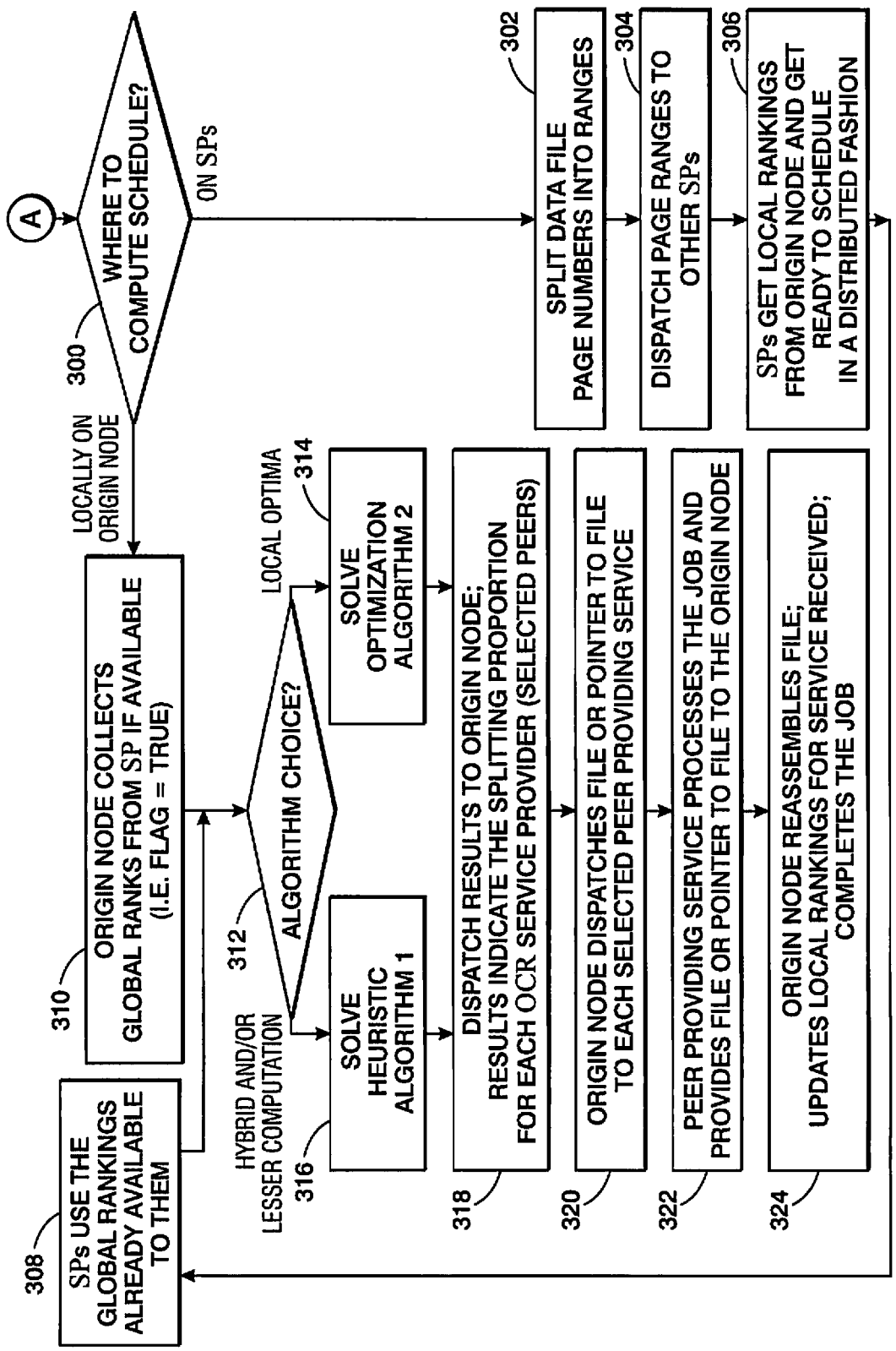
FIG. 3 is a continuation of the flowchart diagram of FIG. 3.

As discussed above, Steps 1-4 may be performed by the origin node 112 or the SPs 102, depending on the output of determination step 300 in FIG. 3. At Step 1, the global rankings are gathered, with each rank for a node i being a scalar quantity. The global rankings may be available at the node doing the processing or may need to be gathered via the SPs 102. At Step 2, the Q matrix is normalized. Furthermore, at this step, servers may be rejected for not meeting QoS constraints.

At Step 3, the normalized Q matrix is adjusted using the assigned weighting values. At Step 4 a net ranking is determined using both the global rankings and the local rankings. If one of the local rankings or global rankings is not available, the corresponding term in the equation used at Step 4 becomes null or zero. At Step 5, the number of work chunks to be assigned to each server is determined.

---
Algorithm 2 Optimization
---
Let there be N MFDs that responded to advertisements for OCR service from a given origin (i.e. client). Let $\hat{n} = (n_1, n_2, n_3, \ldots, n_N)$ be the number of work units dispatched to each of the N MFDs respectively. Let the total number of chunks be denoted $n_{total}$ (note that $n_{total} = n$ div c, where n is the number of pages and c is the work unit size). Let $\mathcal{N}$ denote the integer space spanned by $\hat{n}$ where each $n_i$ is s.t. $0 \le n_i \le N$. We are interested in solving for $\hat{n}$ as the solution to a constrained optimization problem. In the case of D_OCR, the remote stages for which we need to be optimizing are S = {get_data, ocr, send_result} (stages from server's perspective). Let $t_s$ be the time taken on average for stage s where $s \in S$. In particular if stage s is carried out on the $i^{th}$ MFD where i is one of the N MFDs, then we denote the stage time as $t_{si}$. $\Sigma_{s \in S} t_{si}$ is the total time taken at each node i for all the stages in S.

$$\hat{n} \ast= \underset{\hat{n} \in N}{\text{argmin}} \left( n_1 \sum_{s \in S} t_{s1} + n_2 \sum_{s \in S} t_{s2} + \ldots + n_N \sum_{s \in S} t_{sN} \right)$$

s.t.

$$\sum_{i=1}^{N} n_i = n_{total} \quad (1)$$

$$\sum_{i=1}^{N} \frac{n_1 t_{si}}{n_{total}} \le \Delta_s, \forall s \in S \quad (2)$$

$$n_i \ge 0, \forall i = \{1, \ldots, N\} \quad (3)$$

The above optimization problem gives the required ratio $n_1:n_2:n_3: \ldots :n_N$ with which the work units could be split amongst respondents. Constraint (1) ensures that there are exactly $n_{total}$ work units. In the case of excess resources where racing (sending the same work unit to different computing resources) is allowed, the number of actual work units including replication will exceed $n_{total}$. In this case there will be an extra constraint to ensure that identical work units are not dispatched to the same resource. Constraint (2) ensures that for every stage $s \in S$ we adhere to the QoS $\Delta_s$ across all the respondents per job (average response time of every stage is lesser than that stage type's $\Delta_2$). $\Delta_s$ is calculated by the client by maintaining historical information - i.e. a time series of the corresponding stage response times per respondent. Constraint (3) will allow sonic nodes to not receive any work units because they may adversely affect the QoS. Note also that $t_{si}$s can be multiplied by weights $w$ to account for the relative importance as in Algorithm 1.

---

Algorithm 2 employs local rankings in the form of ($t_{si}$). Weights associated with the stages may also be accounted for by multiplying the normalized weights corresponding to each stage s with the weight of the stage $w_s$. The approach of Algorithm 2 is to provide an optimization solution. The output is $[n_1, n_2, n_3 \ldots n_N]$, which is solved for while meeting Constraints (1)-(3). With respect to Constraint (2), $\Delta_s$ is a predetermined value for ensuring QoS that is set by an administrator.

Additional constraints may be added to the optimization problem of Algorithm 2 as well as to determining the output for Algorithm 1. For example, overloading of respondents may be avoided by prohibiting respondents that are to be allocated a portion of the job from taking local submitted OCR (or other) jobs. Such a ban from taking locally submitted jobs may be in effect, for example, from the time the respondent responds to a job advertisement, or alternatively from the time it receives its job portion assignment.

Algorithms 1 and 2 are exemplary and other algorithms that take into account at least one of the local and global rankings for selecting and/or apportioning portions of the received job are within the scope of this disclosure. Algorithm 2 as shown does not take into account global rankings, but it is envisioned that the algorithm could be adjusted to account for global rankings.

Algorithms 1 and/or 2 may take into account a set of predetermined constraints. For example, a constraint value may indicate that it is required that a particular stage be performed within k seconds. If the constraint is not met by a particular server, e.g., the QoS value for that that stage for that server is greater than k, then that particular server may be flagged as rejected and will not be sent any work chunks to process or will be sent a reduced number of work chunks. In another example, servers that are flagged as rejected will not be assigned any work chunks or will be sent fewer work chunks than computed for allocation by the algorithm.

The SPs 102 and the peers 104 each have processors that execute software modules, such as the grid software or software modules for performing the method of the disclosure described above, including advertising jobs, responding to job advertisements, maintaining and accessing global ranks and local ranks, splitting the job into portions, scheduling jobs (including selecting peers 104 from the respondents to execute the job and apportioning the job portions to the selected peers 104), dispatching data to the selected peers 104, executing the apportioned job portions, reassembling the job results and outputting the job results. Each software module includes a series of programmable instructions capable of being executed by the processor. The series of programmable instructions can be stored on a computer-readable medium, such as RAM, a hard drive, CD, smart card, 3.5" diskette, etc., or transmitted via propagated signals for being executed by the processor for performing the functions disclosed herein and to achieve a technical effect in accordance with the disclosure. The functions of the respective software modules may be combined into one module or distributed among a different combination of modules.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A grid of computing devices comprising a plurality of nodes having processors, the plurality of nodes comprising:
    a plurality of networked super-peers nodes (SPs);
    a plurality of peer nodes (peers) grouped into at least two groups, wherein the peers in a group are in data communication with one another, and each SP of the plurality of SPs is associated with a respective group of the at least two groups and in data communication with the peers in the group for forming a region;
    wherein an origin node receives a job including data and a request to perform an operation on the data and initiates advertising the job for requesting the plurality of nodes to participate in executing the requested operation on the data, wherein nodes of both the plurality of SPs and the plurality of peers are configured to be and are capable of being the origin node;
    at least one node of the plurality of nodes responds that it is available and capable of performing the requested operation;
    at least one node from the responding at least one node is selected by an SP of the plurality of SPs or a peer of the plurality of peers;
    portions of the job data are apportioned by an SP of the plurality of SPs or a peer of the plurality of peers to the selected at least one node;
    the respective portions of the job data are dispatched to the selected at least one node which they are apportioned to;
    the respective selected at least one node executes the requested operation on the respective portions of job data dispatched to them;
    the origin node advertises the job using a multicast protocol;
    the at least one node of the plurality of nodes responds using a unicast protocol;
    wherein each of the plurality of SPs and the plurality of peers includes a physical resource, wherein the selected at least one node is selected in accordance with at least one of a global ranking and a local ranking associated with the responding at least one node, wherein the global ranking is based on past performance of the physical resource associated with the ranked node as viewed by at least two nodes of the grid, and the local ranking is based on past performance of the physical resource associated with the ranked node as viewed by the origin node; and,
    wherein at least one of the selected at least one nodes includes a printing mechanism.

2. The grid in accordance with claim 1, wherein advertising the job includes the origin node sending a request to the peers in its region to participate in executing the requested operation on a portion of the job data and notifying the SP associated with its region about the job advertisement, the SP sending a request to other SPs of the plurality of SPs, and each of the SPs that receives the request sending the request to the peers in a region associated with the respective SP.

3. The grid in accordance with claim 1, wherein the origin node executes an algorithm to select the at least one node and to apportion the job data to the at least one selected node.

4. The grid in accordance with claim 3, wherein the origin node receives the global rankings from the SP associated with its region.

5. The grid in accordance with claim 1, wherein at least one SP of the plurality of SPs executes an algorithm to select the at least one node and to apportion the job data to the at least one selected node, wherein the SPs of the at least one SP execute the algorithm for different respective portions of the job data.

6. The grid in accordance with claim 5, wherein the SP gets the local rankings from the origin node.

7. The grid in accordance with claim 1, wherein the origin node dispatches the respective job data portions to the selected at least one node in accordance with the apportionment, and assembles data output by the selected at least one node from the execution of the requested operation on the respective job data portions into a cohesive output.

8. The grid in accordance with claim 1, wherein the origin node receives statistics from the peers that executed the requested operation on the job data portion assigned to them, wherein the statistic is related to the performance of the execution, and the origin node updates the local rankings associated with the respective peers with the statistics received.

9. The grid in accordance with claim 1, wherein at least two of the at least one SPs executing the algorithm execute the algorithm in parallel to select the at least one node and to apportion the job data to the at least one selected node, wherein the SPs of the at least one SP execute the algorithm for different respective portions of the job data.

10. The grid in accordance with claim 5, wherein at least two SPs of the plurality of SPs execute an algorithm to select the at least one node and to apportion the job data to the at least one selected node for the same portion of job data and dispatch the corresponding results to the origin node, wherein origin node dispatches the apportioned job data in accordance with the results received from one of the at least two SPs that satisfies a predetermined condition.

11. The grid in accordance with claim 1, wherein at least two of the selected nodes execute their respective requested operations at substantially the same time.

12. The grid in accordance with claim 1, wherein the same portions of job data are apportioned and dispatched to a first and second peer of the selected at least one node, and the results of the executing by one of the first and second peers that satisfies a predetermined condition is dispatched to the origin node.

13. A decentralized network comprising:
a plurality of networked super-peers nodes (SPs);
a plurality of peer nodes, each peer node in data communication with at least one other peer node of the plurality of peer nodes, the plurality of peer nodes including a plurality of multifunction devices (MFDs), each MFD comprising a printing mechanism,
the plurality of peer nodes grouped into at least two groups, wherein the peers in a group are in data communication with one another, and each SP of the plurality of SPs is associated with a respective group of the at least two groups and in data communication with the peers in the group for forming a region;
wherein a peer node of the plurality of peer nodes referred to as an origin node receives a job which includes data and a request to perform an operation on the data;
wherein nodes of both the plurality of SPs and the plurality of peer nodes are configured to be and are capable of being the origin node;
processing means for selecting at least two MFDs of the plurality of MFDs to execute the requested operation on at least a portion of the job data, wherein the execution includes using at least one printing mechanism of the at least two MFDs;
processing and communication means for apportioning portions of the job data to the selected at least two MFDs and for dispatching the portions to the MFD to which they are apportioned for execution of the requested operation thereon;
wherein historical information related to at least one of configuration and previous performance of the MFDs of the plurality of MFDs is used to perform at least one of the selecting and the apportioning;
the origin node advertises the job using a multicast protocol the at least one node of the plurality of nodes responds using a unicast protocol; and
wherein each of the plurality of SPs and the plurality of peer nodes includes a physical resource, wherein the selected at least one node is selected in accordance with at least one of a global ranking and a local ranking associated with the responding at least one node, wherein the global ranking is based on past performance of the physical resource associated with the ranked node as viewed by at least two nodes of the grid, and the local ranking is based on past performance of the physical resource associated with the ranked node as viewed by the origin node.

14. The network in accordance with claim 13, wherein the plurality of SPs and the plurality of peer nodes include the plurality of MFDs, the processing means for selecting and the processing and communication means for apportioning and for dispatching.

15. The network in accordance with claim 13, wherein the data is split into work chunks, wherein the apportioning includes apportioning the work chunks among the selected MFDs.

16. The network in accordance with claim 13, wherein each of the MFDs includes a physical resource, and the historical information includes local rankings maintained by the origin node based on past performance by the physical resource of other MFDs of the plurality of MFDs from the perspective of the origin node.

17. The network in accordance with claim 13, wherein each of the MFDs includes a physical resource, and the historical information includes global rankings based on at least one of configuration and past performance of the physical resource of the MFDs of the plurality of MFDs from the perspective of at least two nodes of the plurality of SPs and the plurality of peer nodes.

18. The network in accordance with claim 17, wherein the global rankings are maintained in a distributed and decentralized manner by the plurality of MFDs.

19. A method for scheduling jobs arriving at a decentralized network, the method comprising:
a plurality of networked super-peers nodes (SPs);
a plurality of peer nodes (peers) grouped into at least two groups, wherein the peers in a group are in data communication with one another, and each SP of the plurality of SPs is associated with a respective group of the at least two groups and in data communication with the peers in the group for forming a region;
receiving at an origin node of a plurality of nodes of the decentralized network a job including data and a request to perform an operation on the data, wherein the network includes a plurality of multifunction devices (MFDs), each MFD comprising a printing mechanism;
wherein nodes of both the plurality of SPs and the plurality of peers are configured to be and are capable of being the origin node;
selecting at least two MFDs of the plurality of MFDs to execute the requested operation on at least a portion of the job data, wherein the execution includes using at least one printing mechanism of the at least two MFDs;
apportioning portions of the job data to the selected at least two MFDs for processing thereof by executing the requested operation;
wherein the selecting and the apportioning are performed using historical information related to previous performance of the plurality of MFDs;
the origin node advertises the job using a multicast protocol;
the at least two MFDs respond using a unicast protocol; and,
wherein each of the plurality of SPs and the plurality of peers includes a physical resource, wherein the selected at least one node is selected in accordance with at least one of a global ranking and a local ranking associated with the responding at least one node, wherein the global ranking is based on past performance of the physical resource associated with the ranked node as viewed by at least two nodes of the grid, and the local ranking is based on past performance of the physical resource associated with the ranked node as viewed by the origin node.

20. The method according to claim 19, wherein the plurality of nodes wherein the selecting and apportioning is performed by the plurality of SPs and the plurality of peers.

21. The method according to claim 19, further comprising splitting the job data into work chunks, wherein the apportioning includes apportioning the work chunks among the selected MFDs.

22. The method according to claim 19, wherein each of the MFDs includes a physical resource, and the historical information includes local rankings maintained by the origin node based on past performance by the physical resource of other MFDs of the plurality of MFDs from the perspective of the origin node.

23. The method according to claim 19, wherein each of the MFDs includes a physical resource, and the historical information includes global rankings based on performance of the physical resource of the plurality of MFDs from the perspective of at least two nodes of the plurality of SPs and the plurality of peers.

24. The method according to claim 23, further comprising:
maintaining the global rankings in a distributed and decentralized manner by the plurality of MFDs.

* * * * *